US006814780B2

(12) United States Patent
Bikson et al.

(10) Patent No.: US 6,814,780 B2
(45) Date of Patent: Nov. 9, 2004

(54) HOLLOW FIBER MEMBRANE GAS SEPARATION CARTRIDGE AND GAS PURIFICATION ASSEMBLY

(75) Inventors: Benjamin Bikson, Brookline, MA (US); Scott Andrew Bartholomew, Worcester, MA (US); Salvatore Giglia, Norwood, MA (US); Bradley Quinn Johnson, Lakeville, MA (US)

(73) Assignee: L'Air Liquide, Societe Anonyme A Directoire et Conseil de Surveillance Pour L'Etude et L'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/846,233

(22) Filed: May 2, 2001

(65) Prior Publication Data
US 2002/0162451 A1 Nov. 7, 2002

(51) Int. Cl.⁷ .......................... B01D 53/22; B01D 63/02
(52) U.S. Cl. ....................... 95/51; 95/52; 95/54; 95/55; 96/8; 96/10; 96/13
(58) Field of Search .............................. 95/45, 51, 52, 95/54, 55; 96/8–10, 13, 14; 210/321.8, 321.89

(56) References Cited

U.S. PATENT DOCUMENTS

| | | | |
|---|---|---|---|
| 3,499,062 A | 3/1970 | Geary, Jr. et al. .............. 264/36 |
| 3,616,929 A | 11/1971 | Manjikian ................... 210/321 |
| 3,722,694 A * | 3/1973 | Agranat .................. 210/321.89 |
| 3,735,558 A | 5/1973 | Skarstrom et al. ............. 55/16 |
| 3,981,696 A * | 9/1976 | Lalis et al. ....................... 96/8 |
| 4,002,567 A | 1/1977 | Konno et al. ................ 210/333 |
| 4,220,535 A | 9/1980 | Leonard .................. 210/321 R |
| 4,451,369 A | 5/1984 | Sekino et al. ............ 210/321.1 |
| 4,547,289 A * | 10/1985 | Okano et al. ....... 210/321.89 X |
| 4,622,143 A | 11/1986 | Edwards ................... 210/321.1 |
| 4,623,460 A | 11/1986 | Kuzumoto et al. ....... 210/310.1 |
| 4,640,773 A * | 2/1987 | Nishida et al. ............... 96/8 X |
| 4,670,145 A | 6/1987 | Edwards ................... 210/310.1 |
| 4,676,808 A | 6/1987 | Coplan ........................ 55/158 |
| 4,687,578 A | 8/1987 | Stookey .................... 210/321.1 |
| 4,689,255 A * | 8/1987 | Smoot et al. ................ 96/8 X |
| 4,707,267 A | 11/1987 | Johnson ..................... 210/650 |
| 4,718,921 A | 1/1988 | Makino et al. ................ 55/16 |
| 4,781,834 A | 11/1988 | Sekino et al. .......... 210/321.88 |
| 4,832,841 A * | 5/1989 | Gutman et al. ..... 210/321.89 X |
| 4,865,736 A | 9/1989 | Coplan .................. 210/321.79 |
| 4,871,379 A | 10/1989 | Edwards ....................... 55/158 |
| 4,881,955 A | 11/1989 | Bikson et al. ................. 55/16 |
| 4,929,259 A | 5/1990 | Caskey et al. ................ 55/158 |
| 4,941,897 A * | 7/1990 | Vann, III .......................... 96/8 |
| 5,013,437 A | 5/1991 | Trimmer et al. ....... 210/321.78 |
| 5,026,479 A | 6/1991 | Bikson et al. ............ 210/321.8 |
| 5,041,220 A * | 8/1991 | Lee et al. ................ 210/321.8 |
| 5,108,464 A | 4/1992 | Friesen et al. ................. 55/16 |
| 5,133,858 A * | 7/1992 | Walz et al. ................... 96/8 X |
| 5,137,631 A | 8/1992 | Eckman et al. .......... 210/321.8 |
| 5,158,581 A | 10/1992 | Coplan .......................... 55/16 |
| 5,160,042 A | 11/1992 | Bikson et al. ............ 210/321.8 |
| 5,169,530 A | 12/1992 | Schucker et al. ...... 210/321.81 |
| 5,211,728 A | 5/1993 | Trimmer ........................ 55/16 |
| 5,288,308 A | 2/1994 | Puri et al. ........................ 96/8 |
| 5,352,361 A | 10/1994 | Prasad et al. .......... 210/321.81 |
| 5,411,662 A | 5/1995 | Nicolas, Jr. et al. ..... 210/312.8 |
| 5,470,469 A | 11/1995 | Eckman ................... 210/321.8 |
| 5,525,143 A | 6/1996 | Morgan et al. ................. 95/52 |
| 5,554,283 A * | 9/1996 | Brinda et al. ................ 96/8 X |
| 5,695,702 A * | 12/1997 | Niermeyer ................... 96/8 X |
| 5,762,789 A * | 6/1998 | De Los Reyes et al. . 210/321.8 X |
| 5,938,922 A | 8/1999 | Fulk, Jr. et al. ........ 210/321.81 |
| 6,153,097 A | 11/2000 | Jensvold et al. ....... 210/321.81 |
| 6,180,168 B1 | 1/2001 | Stookey et al. ............. 427/325 |

FOREIGN PATENT DOCUMENTS

| | | | | |
|---|---|---|---|---|
| JP | 06-134244 A | * | 5/1994 | ....................... 96/8 |
| JP | 06-134245 A | * | 5/1994 | ....................... 96/8 |
| JP | 06-134246 A | * | 5/1994 | ....................... 96/8 |
| JP | 06-238119 A | * | 8/1994 | ....................... 96/8 |

* cited by examiner

Primary Examiner—Robert H. Spitzer
(74) Attorney, Agent, or Firm—Linda K. Russell (57) ABSTRACT

A hollow fiber membrane gas separation apparatus of a compact design suitable for separation and purification of gases is disclosed. The apparatus comprises an outer housing that consists of a detachable bowl and a head closure, and a removable hollow fiber membrane cartridge positioned therein. The cartridge contains a concentric tubular inner core member and is surrounded by a shell and at least one end closure. The cartridge is attached by its first axial end in a sealed and removable manner to a gas flow conduit positioned coaxially in the housing closure wherein the conduit is in fluid communication with a gas inlet or product gas outlet port formed in the housing head closure and by its second axial end to a waste gas exit port in the bowl. The feed gas inlet port and the product gas outlet port in the head closure are spaced in a straight line for a short overall distance providing for a linear connection with other components of a gas separation system, which is a preferred system component packaging.

35 Claims, 4 Drawing Sheets

HOLLOW FIBER MEMBRANE GAS SEPARATION CARTRIDGE AND GAS PURIFICATION ASSEMBLY

BACKGROUND OF THE INVENTION

1. Field of the Invention

The present invention relates to a gas separation apparatus, more particularly, to a gas separation apparatus using hollow fiber membranes that exhibit selective permeability to gases. The gas separation apparatus of this invention features a compact gas filtration housing and a removable hollow fiber membrane cartridge positioned therein. The apparatus is particularly useful for dehumidifying compressed air and generating nitrogen enriched air.

2. Description of the Related Art

Fluid separation devices for separating components of a fluid mixture by using hollow fiber membranes having a selective permeability are used in a number of industrial separations including gas separations, dialysis, ultrafiltration, reverse osmosis and the like. The design of the hollow fiber fluid separation devices of these fluid separation applications is taught in U.S. Pat. Nos. 3,722,694; 4,451,369; 4,622,143; 4,623,460; 4,670,145; 4,707,267; 4,781,834; 4,865,736; 4,871,379; 4,881,955; 4,929,259, 5,137,631; 5,211,728; and 5,470,469.

In general, a hollow fiber fluid separation apparatus is comprised of a bundle of hollow fibers constituted within a casing. The bundle is potted with a resinous potting agent at the terminal ends to form tubesheets that provide for a fluid-tight seal between the feed and permeate sides. The resulting bundle is secured removably or permanently in the casing such that the tubesheets divide the casing volume into feed and permeate sections.

The use of various hollow fiber membrane gas separation devices for separating gas mixtures, such as separation of oxygen from nitrogen, recovery of hydrogen from hydrogen-containing gas streams, natural gas sweetening and dehumidification of compressed air is well known in the art. Normally, these separation devices are designed so that the gas mixture can be brought into contact with the hollow fiber membrane therein under a partial pressure differential one or more highly permeable components of the fluid mixture are separated from the less permeable components by permeation through the membrane. The hollow fiber membranes allow the more readily permeable component of the fluid mixture to permeate into the permeate side of the hollow fiber membrane while retaining a substantial portion of the less readily permeable component of the fluid mixture on the nonpermeate side of the hollow fiber membrane. The permeated and the nonpermeated components are removed through or recovered from at least one permeate outlet and at least one nonpermeate outlet, respectively.

In some instances the membrane gas separation devices (assemblies) are designed to provide a purge or a sweep gas on the permeate side of the membrane. The use of a sweep gas on the permeate side of the membrane is beneficial in certain gas separation processes, such as gas dehydration processes, since it decreases the permeate side partial pressure of the more highly permeable component, thus allowing the gas mixture to be more thoroughly stripped on the more readily permeable component. The sweep gas typically flows countercurrently to the direction of the feed/nonpermeate flow. The use of a dry sweep gas can improve the product gas dryness as well as the productivity of the membrane device. A portion of the dry product gas is frequently utilized as the sweep gas generating an internal reflux system. The gas separation assembly that provides for sweep or purge gas introduction generally comprises an annular hollow fiber membrane bundle in an enclosure or a shell having a fluid feed inlet, a nonpermeate outlet, a permeate outlet and a sweep or purge gas inlet. Examples of such membrane assemblies can be found in U.S. Pat. Nos. 3,499,062; 3,735,558; 4,718,921; 5,108,464 and 5,026,479. These fluid separation devices, however, require the use of external plumbing and values to regulate the flow of the sweep gas to be fed to the sweep gas inlet port. In some gas separation applications, such as gas drying, a portion of the nonpermeate product (the dry gas) is used as the sweep gas. The need to manifold the dry sweep gas external to the gas separation apparatus adds to the size and the complexity of the device. Several attempts have been made to provide an internal sweep gas arrangement and an internal sweep gas flow control. U.S. Pat. Nos. 5,411,662 and 5,525,143 disclose such integral hollow fiber membrane devices.

The design of a hollow fiber membrane gas separation apparatus is usually tailored towards specific gas separation processes. For example, a process that requires the use of a fraction of the nonpermeate gas as a sweep on the permeate side of the hollow fiber membrane utilizes a membrane cartridge and a housing enclosure that are substantially different from an apparatus used in a process that does not require the use of the sweep. Furthermore, the cartridge and the housing frequently cannot be used interchangeably for a number of different gas separation applications or, in some instances, even for the same gas separation application that simply requires a different level of product purity. This leads to a proliferation of specialized and frequently unique hollow fiber membrane devices currently employed in the field of gas separations. The membrane gas separation apparatus is frequently utilized in conjunction with prefiltration equipment, such as coalescing filters, that remove oil and water droplets and a carbon trap that is used to remove heavy hydrocarbon vapors that can be harmful to membrane operation. The prevailing designs of membrane gas separation assemblies frequently make it more difficult to integrate membrane device with the prefiltration equipment into a single compact gas separation unit. Thus there still exists a need in the art for a hollow fiber membrane gas separation apparatus of a simple design that can be used interchangeably in a number of different gas separation processes, including processes that require the use of a fraction of the product gas as a sweep and that can be integrated with the standard gas filtration equipment into a compact, functional gas separation system.

It is thus an objective of this invention to provide a hollow fiber membrane cartridge that can be interchangeably installed into a standard gas filtration housing and functionally employed in a manner analogous to that of the standard gas filtration equipment.

It is another objective of this invention to provide a hollow fiber membrane gas separation apparatus that can be used in a number of different gas separation applications, including processes that utilize a fraction of the nonpermeate gas as a sweep internal to the device and are capable of generating end products of different purity with no modification to the housing and only an external adjustment to the membrane cartridge.

It is a further objective of this invention to provide a modular hollow fiber membrane gas separation/purification apparatus with a feed gas inlet and a product gas outlet interfaces that can be easily integrated with the gas prefiltration and post purification equipment into compact gas separation/purification systems.

SUMMARY OF THE INVENTION

According to one embodiment of the present invention, the above objectives and other objectives that are apparent to those skilled in the art are achieved by a gas separation apparatus comprising:

(i) a housing body defined by an essentially cylindrical bowl connected in a sealed and removable manner in correspondence with its axial end portion to a lid, wherein said lid having formed therethrough a feed gas inlet port in a first end of said lid and an outlet product port in a second end of said lid and a gas flow conduit positioned coaxially to said housing body such that said inlet port and said outlet port are spaced essentially in a straight line relative to one another, and said gas flow conduit is placed in fluid communication with said feed gas inlet port or said outlet port, and wherein said bowl being provided with a waste gas exit port placed coaxially to said housing body, and (ii) a substantially cylindrical hollow fiber membrane gas separation cartridge placed coaxially in said housing body and connected in a sealed and removable manner with its first axial end to said gas flow conduit in the lid and with its second axial end to said waste gas outlet port in the bowl said cartridge includes:
  (a) an elongated tubular inner core member,
  (b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side.
  (c) two tubular tubesheets encapsulating both ends of the hollow fiber bundle in a fluid-tight arrangement with one end of the inner core member opening out of one of the tubesheets to permit flow of gas in and out of said inner core member and wherein at least one of said tubesheets is severed to permit unobstructed flow of gas in and out of the hollow fiber lumens,
  (d) a shell and at least one end closure surrounding said hollow fiber membrane bundle.

According to another embodiment of the present invention, the above objectives and other objectives that are apparent to those skilled in the art are achieved by providing a substantially cylindrical hollow fiber gas separation cartridge comprised of:
  (a) an elongated tubular inner core member,
  (b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
  (c) two tubular tubesheets encapsulating both ends of the hollow fiber bundle in a fluid-tight arrangement with one end of the inner core member opening out of one of the tubesheets to permit flow of gas in and out of said inner core member and wherein at least one of said tubesheets is severed to permit unobstructed flow of gas in and out of the hollow fiber lumens,
  (d) a shell and at least one end closure surrounding said hollow fiber membrane bundle,
  (e) two connections at the terminal ends of said cartridge containing at least one gas flow channel positioned essentially concentrically to said bundle body, said connections providing a fluid-tight and detachable seal to the axial ends of a substantially cylindrical external housing.

According to one embodiment, the cartridge is further provided with an externally removable flow-control orifice that channels a fraction of the nonpermeate gas as a sweep to the permeate side of the hollow fiber membranes.

DETAILED DESCRIPTION OF THE INVENTION

Figure 1:
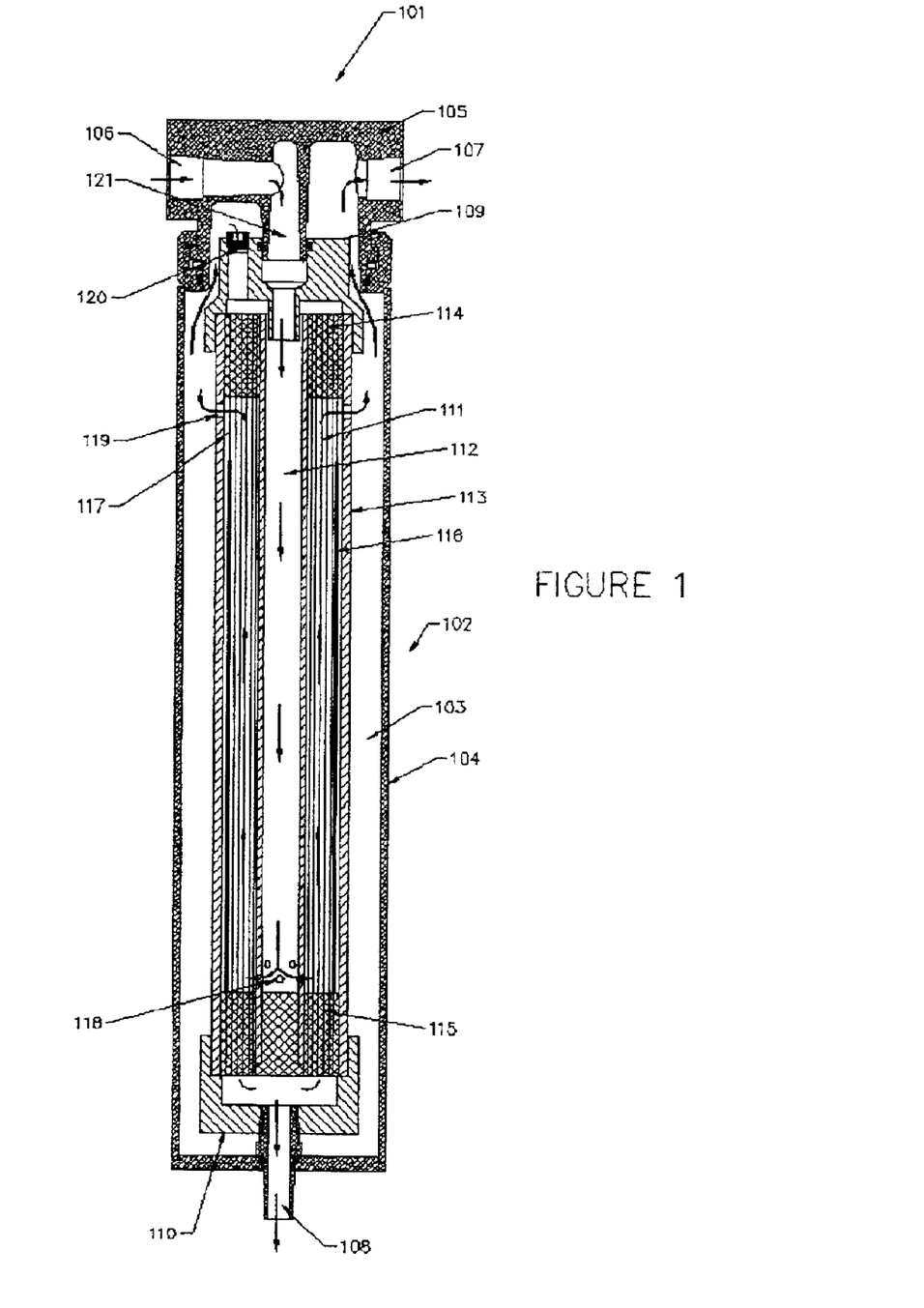
FIG. 1 is a sectional view of a hollow fiber membrane gas purification/separation apparatus in accordance with one embodiment of this invention, wherein the feed gas is introduced internally to the hollow fiber membrane cartridge and the product gas is removed externally of the hollow fiber membrane cartridge, and a portion of the purified nonpermeate product gas is used as a permeate side sweep, the fraction of the product gas utilized as the sweep being controlled by an interchangeable flow-control orifice.

Now referring to the drawings, preferred embodiments of the invention are described below:

FIG. 1 is a sectional view showing a hollow fiber membrane gas purification/separation apparatus in accordance with one embodiment of this invention. The gas purification apparatus 101 comprises an outer housing body or a shell assembly 102 and a hollow fiber membrane cartridge 103 positioned therein. The outer housing is defined by a bowl body member 104 that is essentially cylindrical in shape and is connected in a sealed and removal manner to a head closure member, or a lid 105. The lid 105 connects to the axial-end portion of the bowl body 104 in a removable manner by threads or by a bayonet connector, as shown in FIG. 1, or by any other fluid-tight sealing arrangement. Preferably the housing 102 is a standard gas filtration shell utilized extensively in the art that is adopted to house the hollow fiber membrane gas purification cartridge of this invention.

The head closure 105 contains a feed gas inlet port 106, a purified gas outlet port 107 and a gas transfer conduit 121. The feed and product gas ports are formed in a first and second end of the head closure 105 and are spaced essentially in a straight line relative to one another. The gas transfer conduit 121 is positioned coaxially to the housing body in fluid communication with the feed gas inlet port 106. The bowl 104 contains a waste gas drain port 108.

The housing 102 is made from a metal or a plastic material and is designed to accommodate the hollow fiber membrane gas purification cartridge 103 placed in a chamber formed by the exterior of the housing. The apparatus of this invention is designed to operate at elevated feed pressure with a low feed to nonpermeate product pressure drop. The feed gas can be processed at a pressure as high as 100 atm or higher and is frequently processed at feed pressures from about 8 to 10 atm.

The hollow fiber membrane gas purification cartridge of this invention is positioned in the chamber formed by the exterior housing. The cylindrical hollow fiber membrane cartridge is connected in a sealed and removable manner by its first terminal axial end 109 to the gas transfer conduit 121 in the lid 105 and with its second terminal axial end 110 to the waste gas outlet port 108 in the bowl 104. The cartridge is attached to the port 108 in the bowl 104 by a threaded connection. The connections between the cartridge and the lid and the cartridge and the bowl are sealed with o-rings that provide a fluid-tight seal.

The hollow fiber membrane cartridge 103 comprises an annular hollow fiber membrane bundle 111 arranged around the hollow core tube member 112, surrounded by shell 113 and axial end closures or caps 109 and 110. The bundle 111 is formed by a multiplicity of hollow fiber membranes uniformly arranged around the tubular member 112. One preferred method of forming a uniformly structured hollow fiber bundle is by winding the hollow fibers around the tubular member 112. Both ends of the hollow fiber membrane bundle 111 are encapsulated in tubesheets 114 and 115 in a fluid-tight arrangement with one end of the inner core tube member 112 opening out of the tubesheet 114. The tubesheet ends are severed to allow for unobstructed gas flow from and into the hollow fiber lumens. The exposed hollow fiber membrane bundle between the tubesheets 114 and 115 may be encased, as shown in FIG. 1, with an essentially nonpermeable film barrier or a warp 116 except for a non-encased circumferential region 117 adjacent to the tubesheet 114. The wrap 116 is designed to improve uniformity of gas flow through the bundle and to ease its installation into the external shell 113. The gas flow passageways in the membrane cartridge 103 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into the hollow fiber bundle 111 through openings 118 in the tubular core member 112 and the nonpermeate product gas is removed through the gap 117 and openings 119 in the external shell 113. The openings 118 and 119 are positioned adjacent to the tubesheet 114 and 115, respectively. The permeate gas is withdrawn through the open ends of the hollow fiber lumens on the axial surface of the tubesheet 115. This flow arrangement ensures a substantially countercurrent flow of the feed gas with respect to the permeate gas. The cartridge 103 is further equipped with a flow-control orifice 120 that provides for introduction of a fraction of the nonpermeate gas as a sweep. The orifice 120 is preferably a replaceable orifice attached to the cap 109 by a thread or a similar detachable arrangement. The placement of the orifice 120 can be omitted from the embodiments that do not require the use of the sweep gas internal to the cartridge. Furthermore, the cartridge 103 shown in FIG. 1 can be converted from a cartridge that utilizes the sweep to a cartridge that does not utilize the sweep by sealing the gas passageway in the orifice 120 with a stopper.

In the gas purification/separation process of this invention the feed gas is introduced into the apparatus 101 through the feed port 106 that connects to the hollow gas transport conduit 112 positioned in the center of the cartridge 103. The feed gas is channeled through openings 118 into the shell side of the hollow fiber membrane bundle 111 wherein the feed gas is brought into contact with the exterior of hollow fiber membranes. The feed gas stripped of the undesirable impurities that were removed by permeation into the hollow fiber lumens is then transported through the gap 117 and openings 119 in the exterior cartridge shell and is collected as a product nonpermeate gas through the exit port 107. A fraction of the nonpermeate gas is directed through the orifice 120 into the hollow fiber lumens and is used as a sweep gas on the permeate side of the hollow fibers. The combined permeate/sweep flow stream is removed from the apparatus as a waste gas through the port 108. The orifice 120 is an interchangeable flow-control orifice that is sized to allow a predetermined amount of nonpermeate gas to be used as a sweep. The amount of sweep gas in turn determines the level of product purity. The advantageous feature of the cartridge of this invention is that the same cartridge can be used to generate different purity products by simply changing the size of the orifice. The cartridge can be used for gas separation applications that do not require the use of sweep gas by simply blocking or eliminating the orifice 120.

The apparatus shown in FIG. 1 utilizes a hollow fiber membrane cartridge wherein the feed gas is introduced internal to the cartridge and the nonpermeate gas is withdrawn external to the cartridge.

Figure 2:
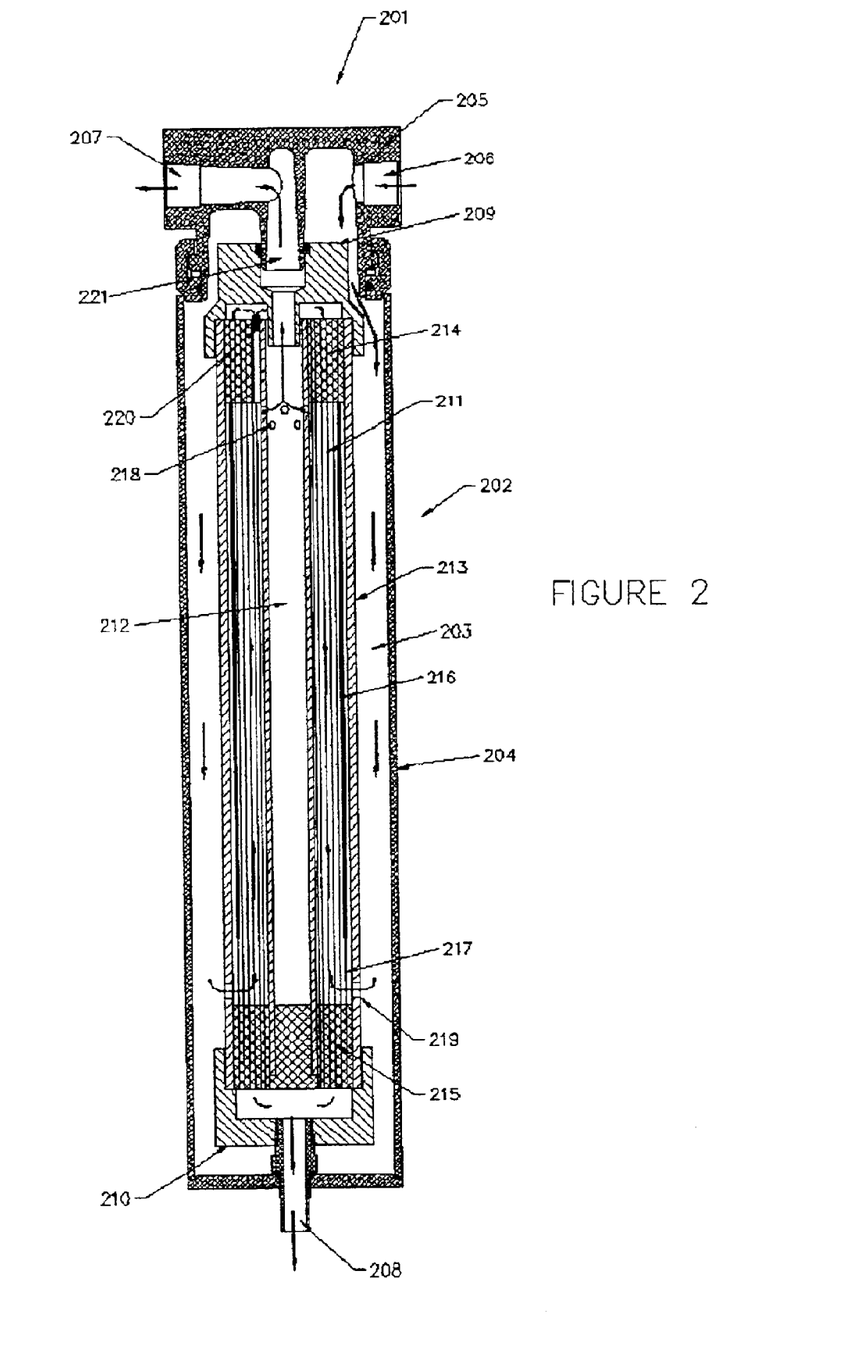
FIG. 2 is a sectional view of a hollow fiber membrane gas purification/separation apparatus in accordance with another embodiment of this invention, wherein the feed gas is introduced externally of the hollow fiber membrane cartridge and the product gas is removed internally to the cartridge, and a portion of the purified product gas is used as a permeate side sweep, the fraction of the product gas utilized as the sweep being controlled by a flow-control orifice.

FIG. 2 is a sectional view showing a hollow fiber membrane gas purification/separation apparatus in accordance with another embodiment of this invention. The apparatus shown in FIG. 2 utilizes a hollow fiber membrane cartridge with a reverse-flow arrangement wherein the feed gas is introduced external to the cartridge and the nonpermeate gas is withdrawn internal to the cartridge. The gas purification apparatus 201 comprises an outer housing body or a shell assembly 202 and a hollow fiber membrane cartridge 203 positioned therein. The outer housing is defined by a bowl body member 204 that is essentially cylindrical in shape and is connected in a sealed and removal manner to a head closure member, or a lid 205. The lid 205 connects to the axial-end portion of the bowl body 204 in a removable manner by a bayonet connector or by any other fluid-tight sealing arrangement. The head closure 205 contains a feed gas inlet port 206, a purified gas outlet port 207, and a gas transfer conduit 221. The feed and product gas ports are formed in a first and second end of the head closure 205 and are spaced essentially in a straight line relative to one another. The gas transfer conduit 221 is positioned coaxially to the housing body and is in fluid communication with the outlet port 207. The bowl 204 contains a waste gas drain port 208.

The cylindrical hollow fiber membrane cartridge 203 is connected in a sealed and removable manner by its first axial end 209 to the gas transfer conduit 221 in the lid 205 and with its second axial end 210 to the waste gas outlet port 208 in the bowl 204.

The hollow fiber membrane cartridge 203 comprises an annular hollow fiber membrane bundle 211 arranged around the hollow core tube member 212, surrounded by shell 213 and axial end caps 209 and 210. The bundle 211 is formed by a multiplicity of hollow fiber membranes uniformly arranged around the tubular member 212. One preferred method of forming a uniformly structured hollow fiber bundle is by winding the hollow fibers around the tubular member 212. Both ends of the hollow fiber membrane bundle 211 are encapsulated in tubesheets 214 and 215 in a fluid-tight arrangement with one end of the inner core tube member 212 opening out of the tubesheet 214. The tubesheet ends are severed to allow for unobstructed gas flow from and into the hollow fiber lumens. The exposed hollow fiber membrane bundle between the tubesheets 214 and 215 may be encased, as shown in FIG. 2, with an essentially nonpermeable film barrier or a wrap 216 except for a non-encased circumferential region 217 adjacent to the tubesheet 215. The wrap 216 is optional and is designed to improve uniformity of gas flow through the bundle and to ease its installation into the external shell 213. The gas flow passageways in the membrane cartridge 203 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into hollow fiber bundle 211 through openings 219 in the external shell 213 and the gap 217 and the nonpermeate product gas is removed through openings 218 in the tubular core member 212. The openings 218 and 219 are positioned adjacent to the tubesheets 214 and 215, respectively. The permeate gas is withdrawn through the open ends of the hollow fiber lumens in the axial surface of the tubesheet 215. This flow arrangement ensures a substantially countercurrent flow of the feed gas with respect to the permeate gas. The cartridge 203 is further equipped with a flow-control orifice 220 that provides for introduction of a fraction of the nonpermeate gas as a sweep. The orifice 220 is preferably attached to the tubesheet 214. The placement of the orifice 220 can be omitted from the embodiments that do not require the use of the sweep gas.

In the gas purification/separation process of this invention the feed gas is introduced into the apparatus 202 through the feed port 206 that connects to the internal housing chamber that contains cartridge 203 positioned therein. The feed gas is channeled through the openings 219 in the cartridge external shell and the gap 217 into the shell side of the hollow fiber membrane bundle 211 wherein the feed gas is brought into contact with the exterior of hollow fiber membranes. The feed gas stripped of the undesirable impurities that were removed by permeation into the hollow fiber lumens is then transported through the openings 218 in the internal tubular conduit 212 and is collected as a product nonpermeate gas through the exit port 207. A fraction of the nonpermeate gas is directed through the orifice 220 into the hollow fiber lumens and is used as a sweep gas on the permeate side of the hollow fibers. The combined permeate/sweep flow stream is removed from the apparatus as a waste gas through the port 208. The orifice 220 is a flow-control orifice that is sized to allow a predetermined amount of nonpermeate gas to be used as a sweep. The amount of sweep gas in turn determines the level of product purity. The cartridge 203 can be used for gas separation applications that do not require the use of the sweep gas by simply blocking or eliminating orifice 220.

Figure 3:
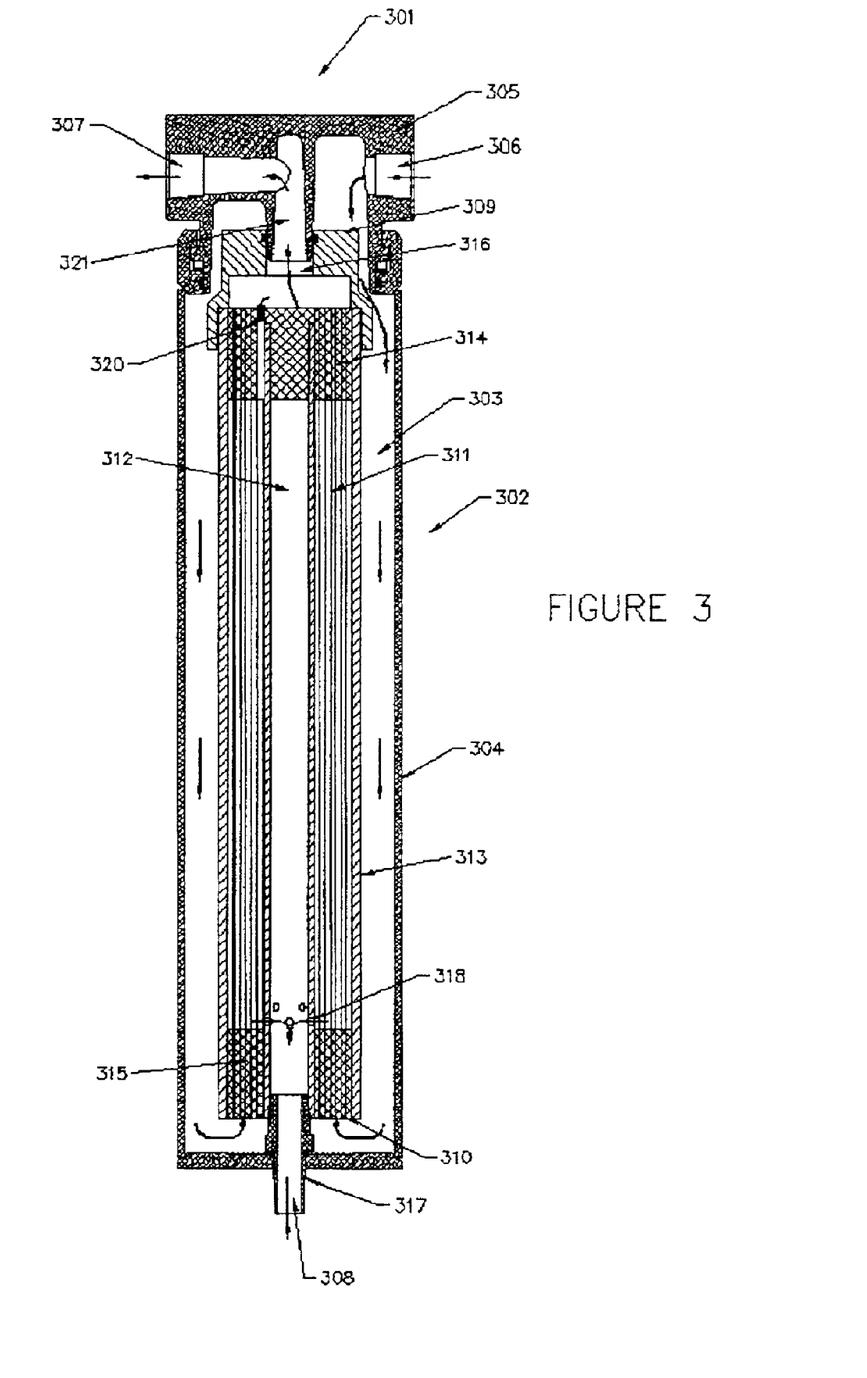
FIG. 3 is a sectional view of a hollow fiber membrane gas purification/separation apparatus in accordance with one embodiment of this invention wherein the feed gas is introduced into the hollow fiber lumens, the permeate gas is collected on the shell side of the hollow fibers and a portion of the purified gas product is used as a permeate side sweep, the fraction of the product gas utilized as a sweep being controlled by a flow-control orifice.

FIG. 3 is a sectional view showing a hollow fiber membrane gas purification/separation apparatus in accordance with another embodiment of this invention. The apparatus shown in FIG. 3 utilizes a hollow fiber membrane cartridge wherein the feed gas is introduced into the hollow fiber lumens and the permeate gas is collected on the shell side of the hollow fibers. The gas purification apparatus 301 comprises an outer housing body or a shell assembly 302 and a hollow fiber membrane cartridge 303 positioned therein. The outer housing is defined by a bowl body member 304 that is essentially cylindrical in shape and is connected in a sealed and removable manner to a head closure member, or a lid 305. The lid 305 connects to the axial-end portion of the bowl body 304 in a removable manner by a bayonet connector or by any other fluid-tight sealing arrangement. The head closure 305 contains a feed gas inlet port 306, a purified product gas outlet port 307, and a gas flow conduit 321. The feed and product gas ports are formed in a first and second end of the head closure 305 and are spaced essentially in a straight line relative to one another. The gas flow conduit 321 is placed coaxially to the housing body and in fluid communication with the outlet port 321. The bowl 304 contains a waste gas drain port 308.

The cylindrical hollow fiber membrane cartridge 303 is connected in a sealed and removable manner by its first axial end 309 to the gas flow conduit 321 in the lid 305 and with its second axial end 310 to the waste gas outlet port 308 in the bowl 304.

The hollow fiber membrane cartridge 303 comprises an annular hollow fiber membrane bundle 311 arranged around the hollow core tube member 312, surrounded by shell 313 and axial end closure or a cap 309. The bundle 311 is formed by a multiplicity of hollow fiber membranes uniformly arranged around the tubular member 312. One preferred method of forming a uniformly structured hollow fiber bundle is by winding hollow fibers around the tubular member 312. Both ends of the hollow fiber membrane bundle 311 are encapsulated in tubesheets 314 and 315 in a fluid-tight arrangement with one end of the inner core tube member 312 opening out of the tubesheet 315. The tubesheet ends are severed to allow for unobstructed gas flow from and into the hollow fiber lumens. The gas flow passageways in the membrane cartridge 303 are arranged to provide for a thermodynamically efficient countercurrent flow arrangement between the feed/nonpermeate stream on the bore side and the permeate/sweep stream on the shell side of the hollow fiber membranes, respectively. The feed gas is introduced into the lumens of the hollow fibers in the axial end of the tubesheet 315 and the nonpermeate product gas is removed from the hollow fiber lumens in the axial end of the tubesheet 314. The product gas is then transported through a gas passageway 316 in the cap 309 and collected through the product exit port 307. The permeate gas from the shell side of the hollow fiber membranes is withdrawn through openings 318 in the inner tubular member 312 that connects through the passageway in the end piece 317 to the waste gas exit port 308. This flow arrangement ensures a substantially countercurrent flow of the feed gas with respect to the permeate gas. The cartridge 303 is further equipped with a flow-control orifice 320 that provides for introduction of a fraction of the nonpermeate gas as a sweep. The orifice 320 is preferably attached to the tubesheet 314. The placement of the orifice 320 can be omitted from the embodiments that do not require the use of sweep gas.

In the gas purification/separation process of this invention, the feed gas is introduced into the apparatus 301 through the feed port 306 that connects to the internal housing chamber that contains cartridge 303 positioned therein. The feed gas is introduced into the lumens of the hollow fiber membranes in the axial end of the tubesheet 315 of the hollow fiber bundle 311 wherein the feed gas is brought into contact with the hollow fiber membranes. The feed gas stripped of the undesirable impurities that were removed by permeation into the shell side of the hollow fibers is then transported through the opening 316 in the end cap 309 and is collected as a product nonpermeate gas through the exit port 307. A fraction of the nonpermeate gas is directed through the orifice 320 into the shell side of the hollow fibers and is used as a sweep gas on the permeate side of the hollow fibers. The combined permeate/sweep flow stream is removed from the cartridge through openings 318 in the tubular core member 312 and then transported from the apparatus 301 as a waste gas through the port 308. The orifice 320 is a flow-control orifice that is sized to allow a predetermined amount of nonpermeate gas to be used as a sweep. The amount of sweep gas in turn determines the level of product purity. The cartridge 303 can be used for gas separation applications that do not require the use of the sweep gas by simply blocking or eliminating orifice 320.

Figures 4, 5:
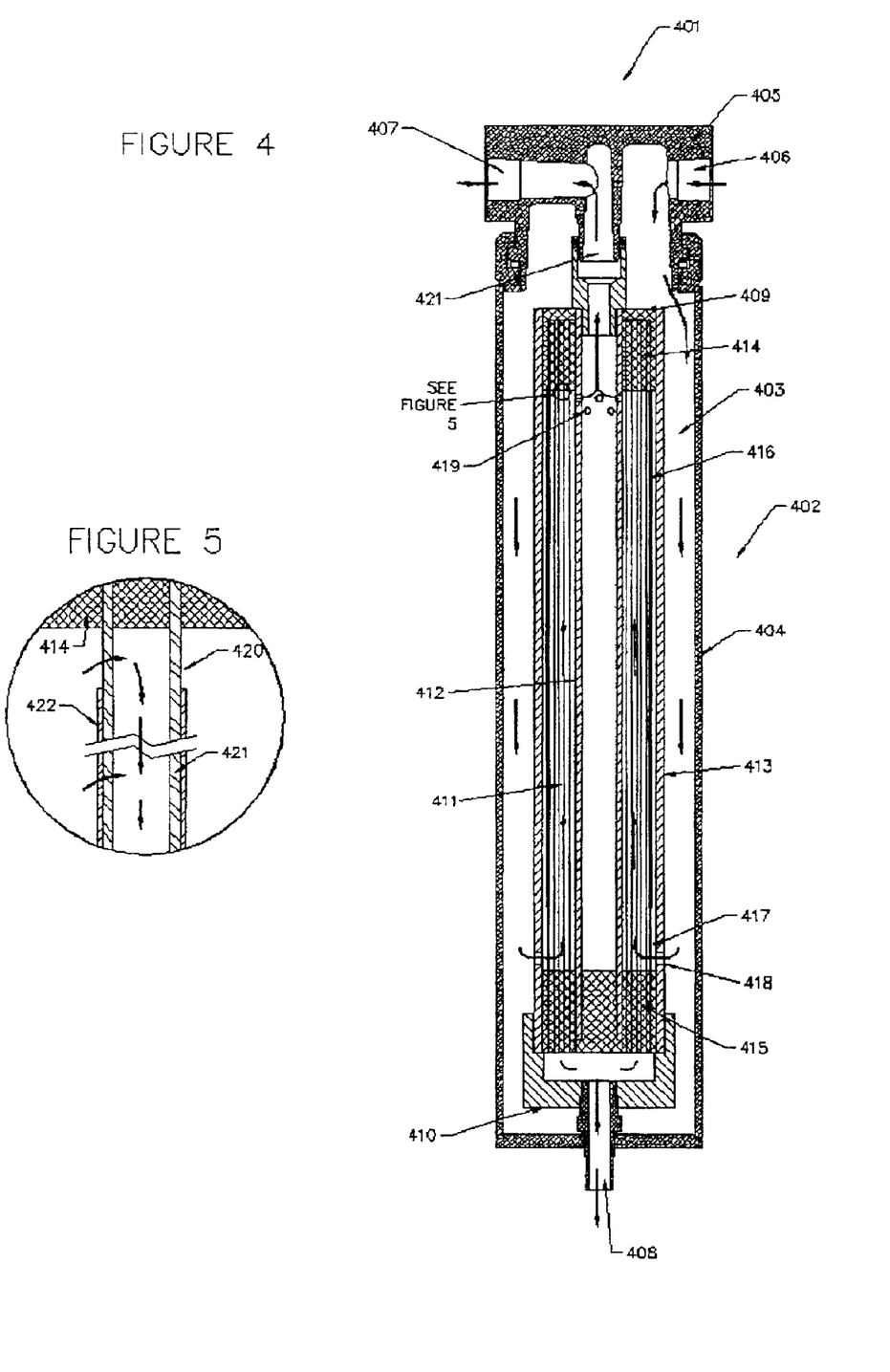
FIG. 4 is a sectional view of a hollow fiber membrane gas purification/separation apparatus in accordance with one embodiment of this invention wherein, the feed gas is introduced to the outside of the hollow fiber membranes and the permeate waste gas is withdrawn through the hollow fiber lumens, and a portion of the nonpermeate purified gas is used as a permeate side sweep internal to the hollow fiber membrane cartridge with the sweep gas being introduced through an uncoated section of the hollow fibers.
FIG. 5 is a detailed enlarged sectional view of the circled region of the hollow fiber membrane gas purification apparatus shown in FIG. 4 that shows the uncoated hollow fiber section utilized as a sweep gas entrance conduit.

FIG. 4 is a sectional view showing a hollow fiber membrane gas purification/separation apparatus in accordance with another embodiment of this invention, wherein the feed gas is introduced to the outside of the hollow fiber membranes and the permeate waste gas is withdrawn through the hollow fiber lumens, and a portion of the nonpermeate purified gas is used as a permeate side sweep internal to the hollow fiber membrane cartridge with the sweep gas being introduced through an uncoated section of the hollow fibers. The gas purification apparatus 401 comprises an outer housing body or a shell assembly 402 and a hollow fiber membrane cartridge 403 positioned therein. The outer housing is defined by a bowl body member 404 that is essentially cylindrical in shape and is connected in a sealed and removable manner to a head closure member, or a lid 405. The lid 405 connects to the axial-end portion of the bowl body 404 in a removable manner by a bayonet connector or by any other fluid-tight sealing arrangement. Preferably the housing 402 is a standard gas filtration shell utilized extensively in the art that is adopted to house the hollow fiber membrane gas purification cartridge of this invention.

The head closure 405 contains a feed gas inlet port 406, a purified gas outlet port 407, and a gas flow conduit 421. The feed and product gas ports are formed in a first and second end of the head closure 405 and are spaced essentially in a straight line relative to one another. The gas flow conduit 421 is positioned coaxially to the housing body and in fluid communications with gas outlet port 407. The bowl 404 contains a waste gas drain port 408.

The cylindrical hollow fiber membrane cartridge 403 is connected in a sealed and removable manner by its first axial end 409 to the gas flow conduit 421 in the lid 405 and with its second axial end 410 to the waste gas outlet port 408 in the bowl 404.

The hollow fiber membrane cartridge 403 comprises an annular hollow fiber membrane bundle 411 arranged around the hollow core tube member 412, surrounded by the shell 413 and axial end caps 409 and 410. The bundle 411 is formed by a multiplicity of hollow fiber membranes uniformly arranged around the tubular member 412. Both ends of the hollow fiber membrane bundle 411 are encapsulated in tubesheets 414 and 415 in a fluid-tight arrangement with one end of the inner core tube member 412 opening out of the tubesheet 414. The end of the tubesheet 415 is severed to allow for unobstructed gas flow from the hollow fiber lumens. The exposed hollow fiber membrane bundle between the tubesheets 414 and 415 may be encased, as shown in FIG. 4, with an essentially nonpermeable film barrier or wrap 416 except for a non-encased circumferential region 417 adjacent to the tubesheet 415. The wrap 416 is optional and is designed to improve uniformity of gas flow through the bundle and to ease its installation into the external shell 413. The gas flow passageways in the membrane cartridge 403 are arranged to provide for a thermodynamically efficient countercurrent flow arrangement between the feed/nonpermeate stream on the shell side and the permeate/sweep stream on the lumen side of the hollow fiber membranes, respectively. The feed gas is introduced into the hollow fiber bundle 411 through openings 418 in the external shell 413 and the gap 417 and the nonpermeate product gas is removed through openings 419 in the tubular core member 413. The openings 418 and 419 are positioned adjacent to the tubesheets 414 and 415, respectively. The permeate gas is withdrawn through the open ends of the hollow fiber lumens in the axial surface of the tubesheet 415. This flow arrangement ensures a substantially countercurrent flow of the feed gas with respect to the permeate gas. A fraction of the nonpermeate gas is directed through the uncoated section of the hollow fiber membranes into the fiber lumens and is used as a sweep gas on the permeate side of the hollow fibers. The procedures to prepare membrane modules that contain two membrane sections, a sweep generating nonselective section and a gas separation section, are described in U.S. Pat. Nos. 4,687,578 and 6,180,168 B1. The region of hollow fiber membranes containing the two sections is shown schematically in FIG. 5. FIG. 5 is a detailed enlarged cross-section of the region adjacent to the tubesheet 414. A single hollow fiber 421 is shown that is coated essentially along its entire length with the coating 422 except for the uncoated region 420 adjacent to the tubesheet 414. The amount of the sweep gas is determined by the size of the uncoated region and is controlled by an in-situ coating process.

In the gas purification/separation process of this invention the feed gas is introduced into the apparatus 401 through the feed port 406. The feed gas is channeled through the openings 418 and the gap 417 into the shell side of the hollow fiber membrane bundle 411, wherein the feed gas is brought into contact with the exterior of hollow fiber membranes. The feed gas stripped of the undesirable impurities that were removed by permeation into the hollow fiber lumens is then transported through the openings 419 in the internal core member 412 and is collected as a product nonpermeate gas through the exit port 407. A fraction of the nonpermeate gas is directed through the uncoated section 420 of the hollow fibers into the hollow fiber lumens and is used as a sweep gas on the permeate side of the hollow fibers. The combined permeate/sweep flow stream is removed from the apparatus as a waste gas through the port 408.

The membrane gas separation apparatus is frequently utilized in conjunction with prefiltration equipment, such as coalescing filters that remove oil and water droplets, particle filters, and carbon traps that are used to remove heavy hydrocarbon vapors that are harmful to membrane operations. In some embodiments, membrane separation apparatus is employed in conjunction with the gas post purification device placed in the back of the membrane separator. One of the advantageous features of the hollow fiber gas separation apparatus of this invention is the positioning of the feed and the product ports, which allows for compact integration with prefiltration and/or post purification devices. The housing that contains the hollow fiber membrane cartridges of this invention is of a design extensively used in the gas filtration field. The feed entrance port of the membrane housing can be connected to the outer ports of the filtration housing of a similar design, wherein the feed and outlet ports of both housings are spaced essentially in a straight line for a short overall distance. Analogous connections can be made between the hollow fiber membrane gas separation apparatus and a post purification apparatus providing for a linear connection of feed and product ports of a shortest possible distance that is preferred in system packaging.

The apparatus of this invention can be used in a number of gas separation and gas purification applications. Assemblies that incorporate the use of a fraction of the nonpermeate gas as a permeate side sweep are particularly useful for removal of water vapor from a pressurized gas stream, such as the dehydration of compressed air and natural gas. Other embodiments can be used to generate nitrogen-enriched air by separating oxygen from nitrogen and for natural gas sweetening by preferential permeation of carbon dioxide and the like gas separation applications. In these gas separation processes, the nonpermeate gas is recovered at elevated pressure as a product. The apparatus of this invention can be further utilized for gas separation processes that generate product gas by permeation through the membrane, such as hydrogen recovery from hydrogen-containing gas streams. The permeate product gas is collected in these cases through the waste gas port at a reduced pressure, and the nonpermeate gas at elevated pressure is recovered through the port otherwise designated as a product port in FIGS. 1 through 4.

What is claimed is:

1. A hollow fiber membrane gas separation apparatus comprising (i) a housing body defined by an essentially cylindrical bowl connected in a sealed and removable manner in correspondence with its axial end portion to a lid, wherein said lid having formed therethrough a feed gas inlet port in a first end of said lid and a product outlet port in a second end of said lid and a gas flow conduit positioned coaxially to said housing body such that said inlet port and said outlet port are spaced essentially in a straight line relative to one another, and said gas flow conduit is placed in fluid communication with said feed gas inlet port or said outlet port, and wherein said bowl being provided with a waste gas exit port placed coaxially to said housing body, and (ii) a substantially cylindrical hollow fiber membrane gas separation cartridge placed coaxially in said housing body and connected in a sealed and removable manner with its first axial end to said gas flow conduit in the lid and with its second axial end to said waste gas exit port in the bowl said cartridge includes:
 (a) an elongated tubular inner core member,
 (b) a substantially cylindrical hollow fiber membrane handle surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
 (c) two tubular tubesheets encapsulating both ends of said hollow fiber bundle in a fluid-tight arrangement with one end of the inner core member opening out of one of said tubesheets to permit flow of gas in and out of said inner core member and wherein at least one of said tubesheets is severed to permit unobstructed flow of gas in and out of the hollow fiber lumens,
 (d) a shell and at least one end closure surrounding said hollow fiber membrane bundle.

2. The apparatus of claim 1 wherein said feed inlet port is in fluid communication with said tubular core member in the hollow fiber membrane cartridge.

3. The apparatus of claim 2 wherein the feed gas is introduced internal to said cartridge and the nonpermeate product gas is removed external to said cartridge.

4. The apparatus of claim 1 wherein said product outlet port is in fluid communication with said tubular core member in the hollow fiber membrane cartridge.

5. The apparatus of claim 4 wherein the feed gas is introduced externally to said cartridge and the nonpermeate product gas is withdrawn internally to said cartridge.

6. The apparatus of claim 4 wherein the feed gas is introduced into the lumens of the hollow fibers in said cartridge and the permeate gas is withdrawn on the shell side of the hollow fiber membranes in said cartridge.

7. The apparatus of claim 6 wherein a portion of the nonpermeate gas is used as a sweep on the permeate side of the hollow fiber membranes.

8. The apparatus of claim 1 wherein a portion of the nonpermeate gas stream is used as a sweep gas on the permeate side of the hollow fiber membranes.

9. The apparatus of claim 8 wherein the portion of the nonpermeate gas used as a sweep is controlled by a flow-control orifice.

10. The apparatus of claim 9 wherein said orifice is replaceable.

11. The apparatus of claim 1 wherein said cylindrical bowl is connected to the said lid by a bayonet connection.

12. The apparatus of claim 1 wherein the said waste gas exit port is used to collect a product gas and the said product outlet port is used to remove a waste gas from said apparatus.

13. The apparatus of claim 1 wherein the feed gas is introduced on the shell side of the hollow fiber membranes in said cartridge and the permeate gas is withdrawn through the hollow fiber lumens.

14. The apparatus of claim 1 wherein said hollow fiber membranes are wound around said tubular inner core member.

15. The apparatus of claim 1 wherein said second axial end of the cartridge is connected by a threaded connection to said waste gas exit port in the bowl.

16. The apparatus of claim 1 wherein connections of said first and second axial ends of the cartridge to said gas flow conduit in the lid and said waste exit port, respectively, are sealed with o-rings.

17. The apparatus of claim 1 wherein said apparatus is further connected through its feed entrance port to a prefiltration cartridge having a feed gas inlet port and filtered gas outlet port, and wherein said inlet port and outlet ports in said prefiltration cartridge are spaced essentially in a straighting line with said feed gas inlet and outlet ports in the gas separation apparatus.

18. The apparatus of claim 1 wherein said hollow fiber membranes are coated along the entire length between said tubesheets except for a narrow region adjacent to one of said tubesheets.

19. The apparatus of claim 1 wherein said hollow fiber membrane bundle is incased with a nonpermeable wrap except for a narrow gap adjacent to one of said tubesheets.

20. A process for separating at least one gas component in a multicomponent gas mixture from at least one other gas component in said multicomponent gas mixture by bringing said mixture into contact with a first side of the hollow fiber gas separation membranes having a first and a second side, said membranes being assembled in a hollow fiber membrane apparatus of claim 1, permeating a portion of said one gas component to one second side of said hollow fiber membranes and recovering a nonpermeate gas depleted from said one gas component from the first side of said hollow fiber membranes.

21. A gas separation process of claim 20 wherein said gas mixture is air and said one gas component is oxygen.

22. A gas separation process of claim 20 wherein said gas mixture is natural gas and said one gas component is carbon dioxide.

23. A gas separation process of claim 20 further utilizing a fraction of the nonpermeate gas as a sweep on the second side of said hollow fiber membranes.

24. A gas separation process of claim 23 wherein said gas mixture is a compressed air stream or a high pressure natural gas stream and said one gas component is water vapor.

25. A gas separation process of claim 20 wherein said gas mixture is a hydrogen-containing gas stream and said one gas component is hydrogen.

26. A gas separation cartridge comprising:
   (a) an elongated tubular inner core member,
   (b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
   (c) two tubular tubesheets encapsulating both ends of the said hollow fiber membrane bundle in a fluid-tight arrangement with one end of the inner core member opening out of one of said tubesheets to permit flow of gas in and out of said inner core member and wherein at least one of said tubesheets is severed to permit unobstructed flow of gas in and out of the hollow fiber lumens,
   (d) a shell and at least one end closure surrounding said hollow fiber membrane bundle,
   (e) two connections at the terminal ends of said cartridge containing at least one gas flow channel positioned essentially concentrically to said bundle body, said connections providing a fluid-tight and detachable seal to the axial ends of a substantially cylindrical external housing.

27. The hollow fiber cartridge of claim 26 wherein said hollow fiber membranes are would around said inner core member.

28. The hollow fiber cartridge of claim 26 wherein the entire exposed length of said hollow fiber bundle between the tubesheets is surrounded by an impervious wrap except for a narrow gap adjacent to one of said tubesheets.

29. The hollow fiber cartridge of claim 26 wherein a flow-control orifice is positioned in said one end closure to allow for a fraction of the nonpermeate gas to be used as a sweep on the permeate side of the membrane.

30. The hollow fiber cartridge of claim 26 wherein a flow-control orifice is placed in one of said tubesheets to allow a fraction of the nonpermeate gas to be used as a sweep on the permeate side of the membrane.

31. The hollow fiber cartridge of claim 26 wherein said hollow fiber membranes are coated along with entire length between the tubesheets except for a narrow region adjacent to one of said tubesheets.

32. The hollow fiber cartridge of claim 26 wherein said tubular inner core member is a feed flow gas inlet conduit or a product gas outlet conduit.

33. The hollow fiber cartridge of claim 26 wherein the tubular inner core member forms said gas flow channel in one or more of the first or second terminal connections of the cartridge.

34. The hollow fiber cartridge of claim 26 wherein the feed gas is introduced into the lumens of the hollow fiber membranes and permeate gas is collected on the shell side of the hollow fiber membranes.

35. The hollow fiber cartridge of claim 26 wherein the feed gas is introduced on the shell side of the hollow fiber membranes and the permeate gas is withdrawn from the lumens of the hollow fiber membranes.

* * * * *

UNITED STATES PATENT AND TRADEMARK OFFICE
CERTIFICATE OF CORRECTION

PATENT NO. : 6,814,780 B2
DATED : November 9, 2004
INVENTOR(S) : Benjamin Bikson et al.

It is certified that error appears in the above-identified patent and that said Letters Patent is hereby corrected as shown below:

Column 11,
Line 53, please replace the word "handle" with the word -- bundle --.

Column 12,
Line 53, please replace the word "straighting" with the word -- straight --.

Column 13,
Line 2, please replace the word "one" with the word -- the --.
Line 30, please delete the word "the".

Column 14,
Line 1, please delete the word "body".
Line 6, please replace the word "would" with the word -- wound --.
Line 22, please replace the word "with" with the word -- the --.

Signed and Sealed this

First Day of February, 2005

JON W. DUDAS
*Director of the United States Patent and Trademark Office*